United States Patent [19]

Pullan

[11] Patent Number: 4,639,601
[45] Date of Patent: Jan. 27, 1987

[54] APPARATUS FOR DETECTING AND DETERMINING THE DISTRIBUTION OF RADIOACTIVITY ON A MEDIUM

[76] Inventor: Brian R. Pullan, 167 Bramhall Lane South, Bramhall, Stockport, SK7 2NG, England

[21] Appl. No.: 574,328

[22] Filed: Nov. 23, 1983

[30] Foreign Application Priority Data

Nov. 25, 1982 [GB] United Kingdom ............. 8233701

[51] Int. Cl.$^4$ ............................................. G01T 1/185
[52] U.S. Cl. ..................................... 250/385; 250/374
[58] Field of Search ............... 378/2, 146; 250/363 S, 250/385, 374

[56] References Cited

U.S. PATENT DOCUMENTS

| | | |
|---|---|---|
| 3,234,386 | 2/1966 | Leventhal et al. |
| 3,860,821 | 1/1975 | Barrett ............. 250/363 S |
| 4,075,491 | 2/1978 | Boyd ................. 250/385 |
| 4,165,462 | 8/1979 | Macovski et al. ....... 378/2 |
| 4,298,796 | 11/1981 | Warner et al. ....... 250/367 |
| 4,526,865 | 7/1985 | Silman . |

FOREIGN PATENT DOCUMENTS

| | | |
|---|---|---|
| 77149 | 4/1983 | European Pat. Off. . |
| 2003319 | 3/1979 | United Kingdom . |
| 2072839 | 10/1981 | United Kingdom .......... 250/363 SP |

OTHER PUBLICATIONS

Botter-Jensen et al., "A Multicounter System for Scanning Ultra-Low-Level Radiochromatograms", Nucl. Instrum. & Methods, 144 (3), 1977, pp. 529–532.

Pullan, "Measuring Radionuclide Distribution with Crossed-Wire Spark Chambers", Nucleonics, Jul. 1966.

Primary Examiner—Carolyn E. Fields
Attorney, Agent, or Firm—Michael Ebert

[57] ABSTRACT

A detecting head assembly provides output signals relating to individual ionizing events due to radioactive decay of material in a medium such as a radiochromatogram or electrophoretogram. The detecting head assembly comprises a scanning head which includes an ionization chamber comprising two spaced detecting electrodes each including an array of spaced conductors. The conductors extend transversely of one another to provide a plurality of conductor crossing points. A mask having a plurality of radiation transmissive zones or apertures is supported relative to the detecting electrodes such that said zones or apertures respectively correspond with the conductor crossing points. The scanning head is slidably supported in juxtaposition with a sample receiving zone and is driven by a stepper motor or motors to cause the scanning head, and hence the mask, to scan a predetermined path, whereby the radiation transmissive zones or apertures in the mask expose corresponding conductor crossing points to respective scanning regions on a sample. Signal processing means, connected to the conductors, include means for coding the output signals with regard to position co-ordinates of the individual ionizing events detected in said scanning regions of said ionization chamber means, and a processor for processing the coded signals in order to provide an output related to the distribution of radioactivity.

10 Claims, 14 Drawing Figures

Scan pattern

FIG.1a.

Scan pattern

APPARATUS FOR DETECTING AND DETERMINING THE DISTRIBUTION OF RADIOACTIVITY ON A MEDIUM

This invention relates to apparatus including a detecting head for detecting and for determining the distribution of radioactivity on media such as radiochromatograms and electrophoretograms.

A radiochromatogram or electrophoretogram generally comprises a support, such as a piece of paper or thin polymer sheet which may be mounted on a plate, on which bands or spots of different materials, at least some of which contain a radioactive isotope, are present. The bands or spots are separated on the support by the respective process of chromatography or electrophoresis and thereby provide a distribution or radioactivity. Such media are herein referred to as 'radiograms'. Typically, the bands of separated materials contain beta-emitting isotopes, the distribution of which require to be detected and/or determined.

One technique for achieving a direct image from a radiogram involves autoradiography. According to this technique, a photographic place is placed in proximity with the radiogram in order to expose the plate directly to beta particle emissions. However, this technique is time consuming in view of the exposure required and it also involves the time and labour of skilled operatives in order to interpret the results. In order to avoid this problem, there have been proposed two other techniques respectively involving the use of multiwire proportional chambers or crossed-wire spark chambers. In the case of multiwire proportional chambers, reference is made to paper No. 18.09 entitled "Biomedical Applications of Digital Autoradiography with a Multiwire Proportional Chamber" by Bellazzini, et al—World Congress on Medical Physics and Biomedical Engineering 1982, Hamburg.

With regard to the use of crossed-wire spark chambers, reference is made to a paper entitled "Measuring Radionuclide Distribution with Crossed-Wire Spark Chambers" by Pullan, et al—Nucleonics, July, 1966.

Whilst both of the latter techniques can be used to achieve suitable results, they involve devices and methods which are currently used in high energy physics laboratories where only a small number of detectors are made and cost is not a problem. Moreover, in the case of spark chambers there is a problem with spurious sparks which renders the devices difficult to use. Such devices are also delicate and liable to damage and contamination, and they do not provide for control of resolution. For example, in the case of multiwire proportional counters, accurate control of resolution is not possible where a wire array is simply placed over an electrophoresis or chromatography plate and repeated placing of objects close to the wire structure will rapidly lead to damage and contamination in ordinary laboratory conditions. Moreover, it is also desirable to protect an operator from the high voltages normally placed on the wires.

One of the aims of the present invention is to facilitate the construction of low cost mass-produced units for detecting the activity on radiograms whilst overcoming some of the disadvantages of current systems.

The present invention generally provides a detecting head assembly for providing output signals relating to individual ionizing events due to radioactive decay of material in a medium, said detecting head assembly comprising (a) scanning head means which includes ionization chamber means comprising two detecting electrode assemblies which are located in spaced relationship, each detecting electrode assembly including an array of spaced conductors, the conductors of one array extending transversely of the conductors of the other array thereby providing a plurality of conductor crossing points; and a mask having a plurality of radiation transmissive zones or apertures therein, said mask being supported relative to said detecting electrode assemblies such that said zones or apertures respectively correspond with said conductor crossing points;

(b) means supporting said scanning head means in juxtaposition with a sample receiving zone; and (c) scanning means to cause relative movement between said scanning head means and said sample receiving zone so that said zones or apertures in said mask scan a predetermined path relative to said sample receiving zone, whereby said zones or apertures expose said corresponding crossing points to respective scanning regions of said sample zone.

An advantage of providing the mask and the scanning arrangement is that it is possible to improve and to define more accurately spatial resolution, since a change in resolution can be accurately made by exchanging a mask having radiation transmitting zones or apertures of given dimensions for another mask having radiation transmitting zones or apertures of different dimensions. A further advantage of using a mask is that fewer conductors are required for the spaced electrodes whereby costs are reduced. The mask also provides protection for the detecting electrode assemblies, which are delicate structures and protects and operator from a high potential which is normally applied to one of the electrode assemblies.

The detecting electrode assemblies may be provided with terminals for connection to signal processing means. Preferably, the mask (which is preferably a composite structure—see below, but which can also be made of stainless steel foil) and one of the detecting electrode assemblies are maintained at earth potential and a voltage source is connected, e.g. through the signal processing means, to the other detecting electrode assembly whereby the latter electrode assembly is maintained to a high positive potential with respect to both the mask and the former electrode assembly. The potentials may be supplied to the electrode assemblies through coding means, which form part of the signal processing means (see below), and which provide coded signal outputs derived from the signals detected by the crossing points of the detecting electrode assemblies.

The ionization chamber means (i.e. including the space between the electrode assemblies) is normally filled with a gas or gas mixture, e.g. typically comprising 90% argon 10% methane. The purity of the gas or gas mixture can be maintained by passing a constant stream thereof through the ionization chamber means in normal operation. In the case of detecting beta radiation having a sufficient range, either the preferred composite mask (see below) which provides a hermetic seal would be used, or windows of thin mica could be placed across through apertures in a perforate mask, so that the ionization chamber means could be sealed after filling. If however tritium ($H^3$) is to be detected, a continuous flow of gas will be required as no such sealing would be practical.

The ionization chamber means may be partly or largely defined by the aforementioned components of the detecting head. For example, the latter-mentioned mask could form one major wall of the chamber. Another major wall of the chamber could be formed by an insulation substrate which supports the conductors of one of the detecting electrode assemblies (see below). The remaining minor side walls of the chamber may be provided by an insulating frame which supports the conductors of the other detecting electrode assembly (see below).

In the case of using a mask having through apertures, an insulating frame (which forms the side walls of the ionization chamber and which can also provide support for e.g. a thin foil mask) may be urged lightly towards, or held in close proximity with the medium (e.g. a radiochromatogram or electrophoretogram mounted on a plate) to close the chamber. In the latter case, when a continuous stream of gas or gases is passed into the chamber, any leakage between the frame and the medium (e.g. plate) will enable a constant gas throughput to be maintained, thus assuring gas purity. The medium itself can thereby contribute towards providing a wall of the ionization chamber. Other arrangements are, however, possible, where the ionization chamber is defined or partly defined by a wall or walls which contain the detecting electrode assemblies and mask.

Preferably, the conductors of one of the detecting electrode assemblies are supported by an insulating substrate, for example, a glass or glass fibre reinforced plastics sheet, and the conductors of the other detecting electrode assembly are supported on an insulating frame, for example, made from a sheet of glass fibre reinforced plastics material or formed by glass strips. The conductors of the former detecting electrode assembly may be gold strips deposited in parallel lines having a predetermined spacing on the insulating substrate. The conductors of the latter detecting electrode assembly may be fine wires which are stretched across the insulating frame and have a predetermined spacing. Advantageously, the insulating substrate and the insulating frame are bonded together as a single unit.

The mask is preferably a composite structure comprising a sheet of radiation transmissive insulating material which is backed by a conductive sheet having a plurality of through apertures therein of the required shape and size. For example, the mask may include a very strong, insulating plastics sheet, such as a sheet of Mylar (Registered Trade Mark), about 15 mircons thick, which is bound to a metallic sheet, of aluminum of stainless steel, having a regular array of through apertures therein which are arranged in rows and columns. This forms a substructure which is easy to handle. The metallic sheet of the substructure is backed by a thicker metallic sheet of e.g. copper, having a corresponding plurality of through apertures in the thinner (aluminum or stainless steel) sheet. Advantages of such a composite construction are that the effective part of the mask, i.e. the thinner metallic sheet is protected from above and below, and that a user can exchange the substructure for another in which the thinner metallic sheet has through apertures of different dimensions as may be required. Alternatively, the mask may be made of a thin stainless steel sheet or foil which is supported by an insulating frame on which it is stretched and bonded and which contains a plurality of through apertures therein.

Preferably, the detecting electrode assemblies form a unit sub-assembly and the mask forms another unit sub-assembly which are held together by temporary fixings to allow a series of different masks, i.e. in which the radiation transmitting zoner or apertures have different dimensions, to be used as required.

In the preferred embodiment, the conductors are similarly and equidistantly spaced in each of the detecting electrode assemblies. The conductors form respective grids in the electrode assemblies, with the grid of one detecting electrode assembly extending transversely, for example, orthogonally, of the grid of the other detecting electrode assembly. The mask comprises a planar member, in which the radiation transmissive zones or apertures are equidistantly spaced, the spacing of the radiation transmissive zones or apertures being similar to the spacing of the conductors of the detector electrode assemblies. The radiation transmissive zones or apertures in the mask are generally smaller than the spacing between adjacent conductors in the grids of the electrode assemblies. The anode grid of conductors which is maintained at a high positive potential may be located midway between the cathode grid of conductors and the mask (which are both maintained at earth potential), whereby a substantially balanced field gradient exists on each side of the anode grid.

The radiation transmissive zones or apertures in the mask are preferably shaped to suit the type of radiogram to be scanned. For example, with a radiogram containing columns of radioactive bands, the radiation transmissive zones or apertures are suitably rectangular in shape with the longest axis of the aperture extending along the length of the band (i.e. with the width of the column). They may be, for example, rectangles with semi-circular ends. If, on the other hand, the radiogram contains spots of radioactivity, the radiation transmissive zones or apertures may still be rectangular, but preferably square (although they could also be circular). The shape of the radiation transmissive zones or apertures is preferably selected with regard to the scanning path, i.e. which is followed when relative movement is caused between the scanning head and the sample receiving zone (see below).

The scanning means preferably comprises at least one stepping motor which is arranged to cause relative movement between the scanning head means and the sample receiving zone. For example, a mask having at least one row of rectangular radiation transmissive zones or apertures may be used for scanning bands of radioactivity (as mentioned above). In the latter case, the stepping motor causes such relative movement that each radiation transmissive zone or aperture (in a row) scans down respective bands of radioactivity (in the respective columns). In the case of scanning spots of radioactivity, the mask preferably contains a regular array of radiation transmissive zones or apertures (e.g. square), which are arranged in columns and rows, and the scanning means preferably comprises two stepping motors for causing relative and respective movements between the scanning head means and the sample receiving zone, in order to provide a serpentine scanning path or raster scan. For example, a first stepping motor is energised to step the scanning head means, and hence the mask, in an X direction to provide a 'horizontal scanning line'. A second stepping motor is then energised to cause the scanning head means, and hence the mask, to step a short distance in a Y direction, where Y is orthogonal to X. The first stepping motor is then re-energised to cause the scanning head means to step in the opposite X direction, to provide another 'horizontal scanning line', and so on, in order to follow the scanning path. In this way, each of the radiation transmissive zones or apertures, in the mask sequentially scans corresponding adjacent areas on the radiogram at each step. The total number of steps is such that each radiation transmissive zone or aperture in the mask scans a respective region or 'frame' of the sample zone, whereby the corresponding conductor crossing points of the detecting electrode assemblies are exposed to that sample region.

The invention also provides apparatus for detecting and determining the distribution of radioactivity in a medium, the apparatus comprising a detecting head in accordance with the present invention, and signal processing means connected to the conductors of said detecting electrode assemblies; said signal processing means including means for coding the output signals from said detecting electrode assemblies with regard to position co-ordinates of individual ionizing events detected in said scanning regions of said ionization chamber means, and a processor for processing the coded signals in order to provide an output to the distribution of radioactivity.

One way of carrying out the invention will now be described with reference to the accompanying schematic drawings (which illustrate embodiments) in which:

FIG. 8 is an enlarged section of the mask shown in FIG. 7, FIGS. 9 and 10 respectively illustrate, in perspective, and cross-sectional elevation, a detecting head according to a preferred embodiment of the invention.

Before describing an example of a detector and counter in accordance with the invention, the basic principle on which the same depends will first be described with reference to FIG. 2.

Figure 2:
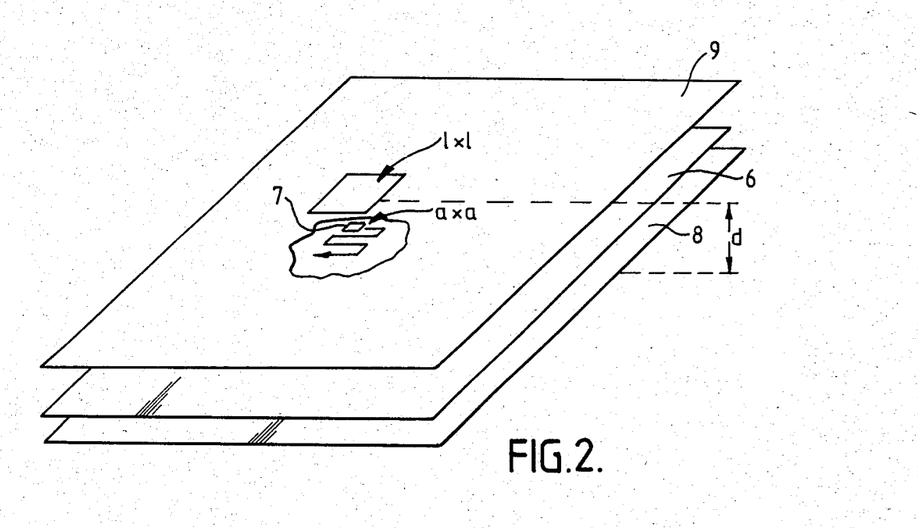
FIG. 2 is a diagram provided for the purpose of explaining the scanning regions ($1 \times 1$) which are seen by conductor apertures crossing points when a mask having a plurality of radiation transmissive zones or apertures ($a \times a$) is scanned over a radiogram.

In FIG. 2, reference 8 represents the plane of a radiogram to be scanned by a mask 6 having a plurality of radiation transmissive zones or apertures 7 (herein-after called mask zones or apertures). The area of one of the mask zones or apertures 7 is $a \times a$, and the area of a corresponding scanning zone is $1 \times 1$. The scanning zone ($1 \times 1$) is situated a distance d above the radiogram 8. For the purpose of explanation, it will be assumed that conductor crossing points of orthogonal conductors respective anode and cathode detecting electrode assemblies (see FIG. 3) lie in plane 9. The plane 9 thus includes a plurality of scanning zones ($1 \times 1$) which are exposed by respective mask zones or apertures 7 ($a \times a$) when the mask 6 is scanned along the serpentine or raster scanning path indicated by the arrow.

The scanning path is such that radioactivity seen by each mask aperture ($a \times a$) can be measured without any interference from the radioactivity seen by adjacent mask zones or apertures.

Thus, in order to record the radioactivity from every point under scanning zone $1 \times 1$, the mask 6 is caused to follow the serpentine scanning path in a series of steps, each step moving each mask zone or aperture 7 into the next adjacent area $a \times a$. If a total time T is devoted to the collection of data, the mask zone or aperture 7 can only spend a time $Ta^2/1^2$ at each element ($a \times a$) of the canning zone ($1 \times 1$). The number of counts or radioactive disintegrations record can be calculated for each elements as follows:

Counts received into $1 \times 1$ is $N = (Cl^2 a^2)/(4\pi d^2)$

Where C is the surface activity.

In a total time T the mask zone or aperture 7 will spend $a^2/1^2$ T at each of the stepped positions.

$$\therefore \text{The count/element in total scan time } T \text{ is } N = \frac{a^2}{l^2} T \frac{Cl^2 a^2}{4\pi d^2} \quad (1)$$

$$\therefore N = \frac{Ca^4 T}{4\pi d^2}$$

Three important facts can be deduced from equation (1) above, namely:

(1) The number of counts/elements is independent of l (2) The number of counts/elements is proportional to $a^4$ (3) The number of counts/elements is proportional to $1/d^2$ The first of these facts clearly indicates that nothing is lost if a detector is divided up into relatively large areas provided a scanning mask is used. This brings a number of benefits. The mask, which may have an array of radiation transmissive zones or apertures "$a \times a$" spaced "$1 \times 1$", would accurately define the spatial resolution and allow changes in resolution to be made accurately and with ease by changing the mask. Correct choice of resolution is very important as can be seen from the Bellazini reference mentioned above. Increasing "a" by a factor of two brings about a sixteen fold increase in the number of detected events. Thus, it is clearly most undesirable to overspecify resolution in any particular experimental situation. Moreover, since accurate control of resolution is not possible with current systems which simply place a wire array over an electrophoresis or chromatography plate as shown in the Bellazini reference mentioned above, the use of a scanning mask provides distinct advantages.

Figure 9:
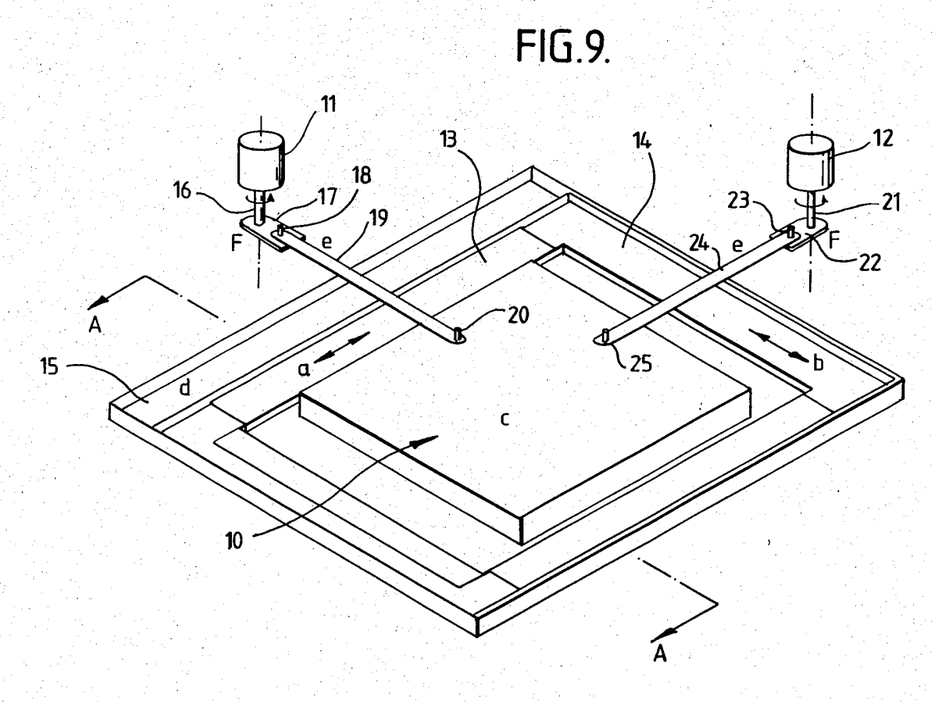

In order to obtain maximum sensitivity, the radiogram should be as close to the detecting plane 9 as possible and thus "d" should be made as small as possible. As multiwire proportional counters are delicate devices, the repeated placing of objects close to the wire structure will rapidly lead to damage and contamination in ordinary laboratory conditions. Thus, the use of a scanning mask will also afford considerable protection to the internal structure of the detector. It will also protect the operator from the high voltages normally placed on the wires.

An example of a multiwire scanning detector, in accordance with the invention, will now be described.

Figure 1A:
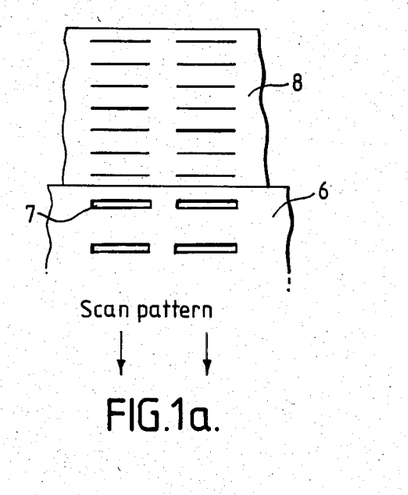
FIGS. 1a and 1b respectively illustrate bands and spots of distributed radioactivity in respective radiograms and, in each Figure, a portion of a scanning mask is shown with appropriate radiation transmissive zones or apertures therein, and arrows are used to indicate suitable scanning paths.
Figure 1B:
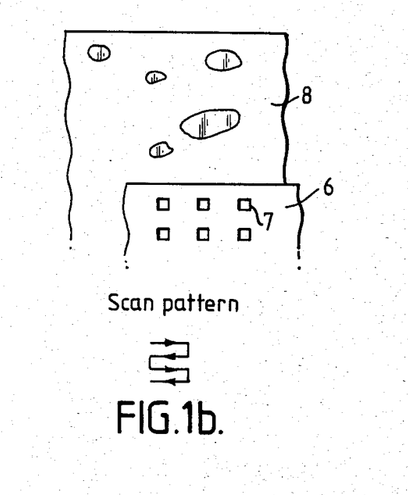

FIGS. 1a and 1b schematically and respectively illustrate bands and spots of distributed radioactivity which would occur in respective radiograms. Bands or spots of radioactivity may be obtained, for example, from either an electrophoretogram or a radiochromatogram. For further information regarding such radiograms, reference is made to European patent application No. 82305198.2 filed in the same of Robert E. Silman. FIGS. 1a and 1b also each indicate part of an apertured mask which is used, as described below, to scan the bands or spots of radioactivity in accordance with a suitable scanning pattern (as indicated by the arrows).

FIGS. 3–10 illustrate a scanning head 10 and its components which can be used, for example, to scan spots of radioactivity on a radiogram 8 (as shown in FIG. 1b).

Figure 4:
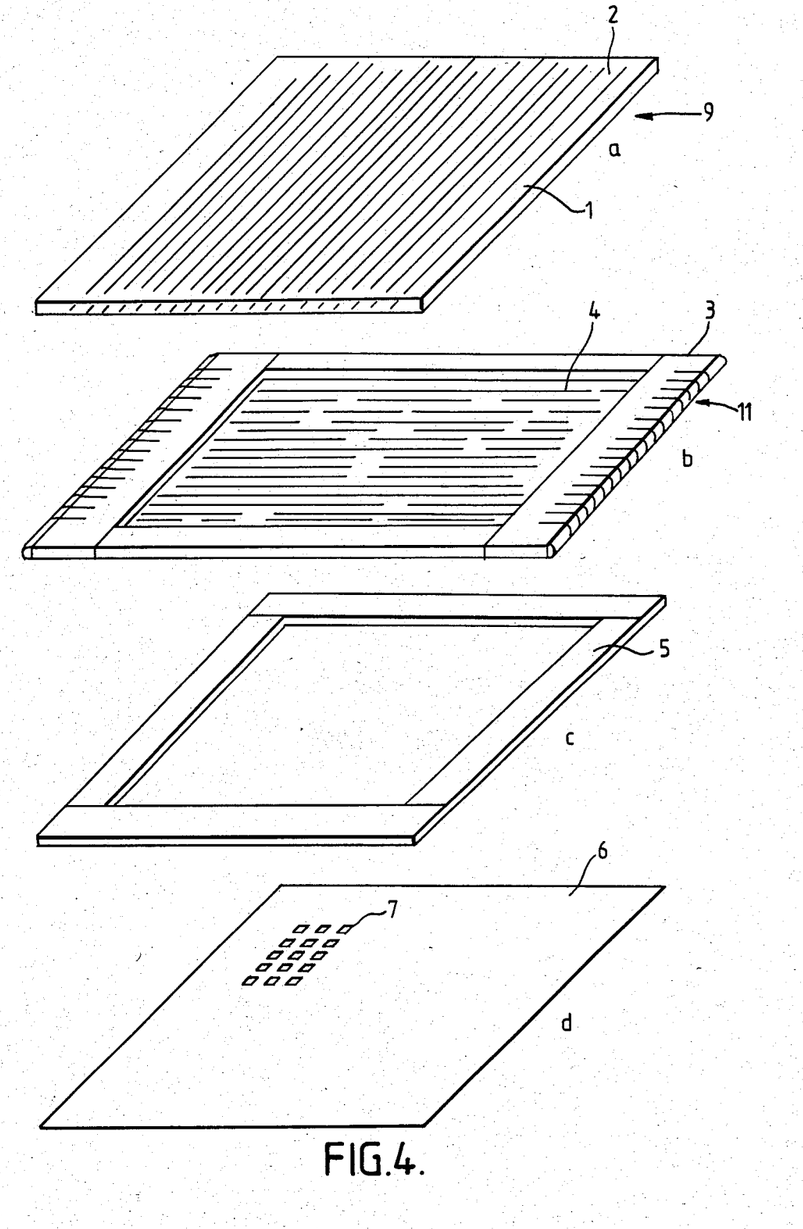
FIG. 4 is an exploded view, in perspective, of the elements of a detecting electrode sub-structure and a mask sub-structure according to one embodiment.

Some of the components of the scanning head according to one embodiment of the invention, namely two detecting electrode assemblies and an apertured mask, are shown, in exploded form, in FIG. 4. In FIG. 4, a cathode detecting electrode assembly 9 comprises a glass plate 1 having gold strips 2 deposited thereon in parallel lines with a spacing of "1" therebetween. Strips 2 form a grid of spaced conductors of the cathode electrode assembly 9. An anode electrode assembly 11 comprises a glass frame 3, which is provided as a support across which fine wires 4 are stretched with spacing "1". Wires 4 form a grid of spaced conductors of the anode electrode assembly. A glass frame 5 is provided as a support across which a mask 6, made of a thin sheet or foil of stainless steel, is stretched. The stainless steel mask 6 has a plurality of photo-etched apertures 7, each measuring a×a, arranged on a regular grid of spacing 1×1. The grid strips 2 and the wires 4 may be provided with terminal means (not shown) to facilitate connection to signal processing means as described below.

The cathode (9) and anode (11) detecting electrode assemblies are preferably bonded together as a single unit as are the glass frame 5 and mask 6. The two resulting components are preferably held together by temporary fixing (not shown) to allow a series of different masks 6 to be used, i.e. having differently sized radiation transmission zones or apertures, as may be required. The detecting electrode unit (8,11) is held together with the mask unit (5,6) such that the crossing points of the conductors 2,4 are aligned with the centres of respective mask zones or apertures 7 (see FIG. 3).

FIGS. 5–8 illustrate a detecting electrode sub-structure and a mask sub-structure according to a further embodiment. This arrangement is preferred for ease of manufacture and handling.

Figure 5:
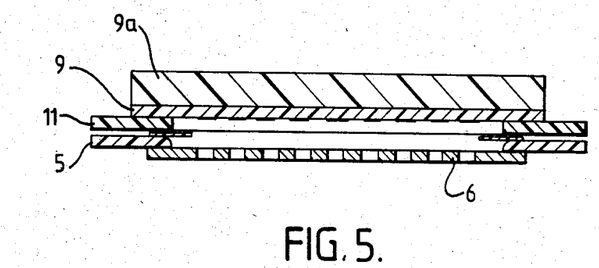
FIG. 5 is an elevation, in section, of a detecting electrode sub-structure and a mask sub-structure according to another embodiment.
Figure 6:
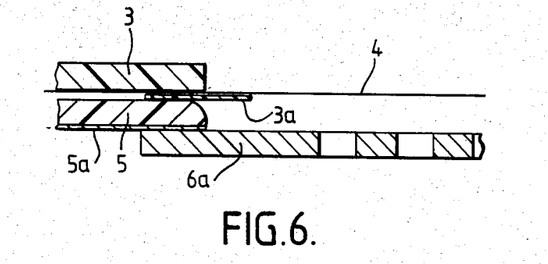
FIG. 6 is an enlargement of a portion of the arrangement shown in FIG. 5.

The arrangement shown in FIGS. 5 and 6 is generally similar to that of FIG. 4 in that it comprises a crossed point detector with a cathode electrode assembly 9 and an anode electrode assembly 11, and a mask 6. However, the manner of construction of the electrode assemblies and the mask is different.

The cathode electrode assembly 9 is formed by tinned copper strips deposited on a glass fibre reinforced plastics substrate (e.g. in the manner of an etched circuit board). The anode electrode assembly 11 is formed by a frame made from a sheet of glass fibre reinforced plastics. On opposite sides of the frame are respective lines of contact pads (not shown) formed by thinner copper strips deposited on the surface. These pads are drilled to accommodate the anode wires 4 which are stretched across the frame.

Figures 7, 7A:
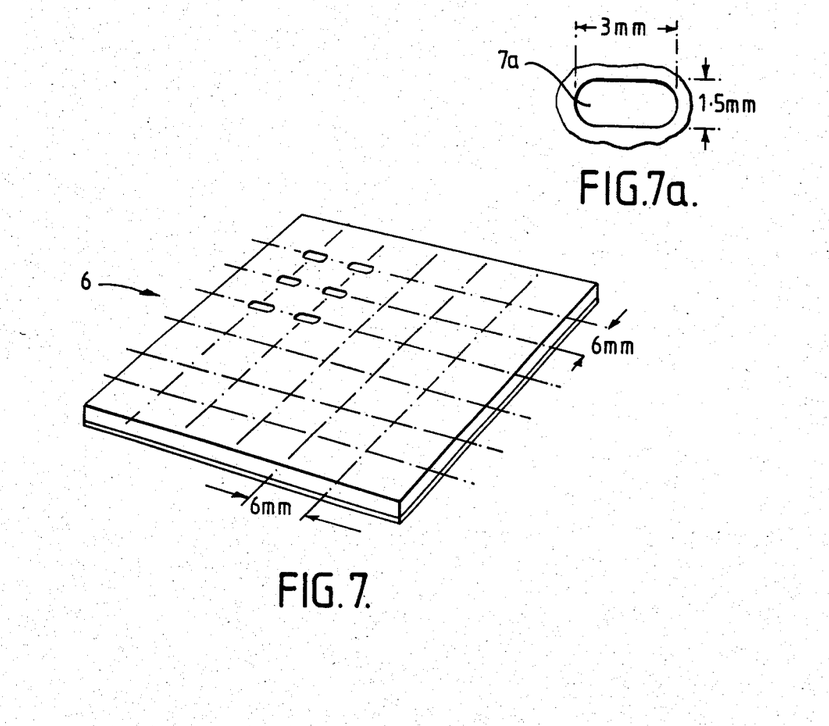
FIG. 7 is a perspective view of the mask used in the arrangement of FIG. 5.
Figure 8:
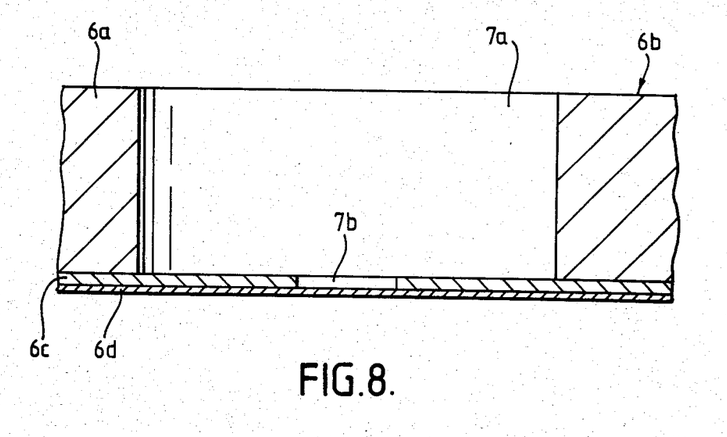

A mask structure 6 is located beneath the anode wire frame 11. An insulating frame made of fibre reinforced plastics material has a conductive underface, i.e. a conductive layer 5a, such as tinner copper bonded to the lower face of the frame. The layer 5a, which is best seen in FIG. 6, makes electrical contact with an apertured copper plate 6a which is best seen in FIGS. 7 and 8. As shown in FIGS. 7 and 8, the copper plate 6a is relatively thick and it has a plurality of relatively large through apertures 7a therein. The upper surface 6b of the copper plate 6a is preferably plated with tin/lead alloy. The through apertures 7a in the copper plate 6a are generally rectangular, but with semi-circular ends, as shown in the inset diagram FIG. 7a. The overall length of each through aperture is about 3 mm and its width is about 1.5 mm. The through apertures 7a are arranged in rows and columns, as shown in FIG. 7, with a spacing between centres, in either the rows or the columns, of about 6 mm. The copper plate 6a is backed by a layer, sheet or foil 6c of aluminum or stainless steel, which is part of a substructure including an insulating sheet 6d. This is best seen in FIG. 8. For each through aperture 7a in the copper plate 6a there is a corresponding through aperture 7b, of relatively smaller dimensions, in the sheet 6c. The metallic sheet 6c is normally permanently bonded to the insulating sheet 6d. The insulating sheet 6d is suitably a thin sheet of very strong material, such as Melinex or Mylar, both Registered Trade Marks. Whilst sheet 6d covers all of the through appertures 7b, it is transmissive, for example, to beta radiation of sufficient range.

A particular advantage of the form of construction shown in FIGS. 7 and 8 is that the effective part of the composite mark 6, namely sheet 6c which defines the radiation transmissive zones, is protected from above by the relativey thick copper layer 6a and from below by the strong insulating sheet 6d. The mask is therefore more robust and better capable of withstanding the handling it will receive under laboratory conditions. Moreover, the substructure 6c/6d can easily be made available with through apertures 7b in a range of different sizes. This enables one substructure 6c/6d to be readily exchanged for another having through apertures 7b of different dimensions in order to change the resolution of the system. Similarly, the substructure 6c/6d can be readily exchanged for another similar one in the event of contamination.

It will be noted that the layers 6c,6d are not shown In FIG. 5 for ease of illustration.

Referring again to FIG. 6, the end of each anode wire 4 (i.e. adjacent each side of the insulating frame 5—only one side being shown in FIG. 6) there is a thin strip 3a of insulating material, such as Mylar or Melinex, both Registered Trade Marks. Each strip 3a passes along the length of the respective side of the frame 5 and projects laterally for a short distance away from the side of the frame beneath the end portions of the anode wire 4. Also, as shown in FIG. 6, the adjacent edge of frame 5 is bevelled or curved. The purpose of strips 3a and the bevelled or curved edge of frame 5 is to provide a long path between the anode wires 4 and the conductive part of mask 6, thereby to prevent "tracking". Such "tracking" could otherwise occur due to the relatively high potential difference between the anode wires 4 and the earthed mask 6.

Figure 10:
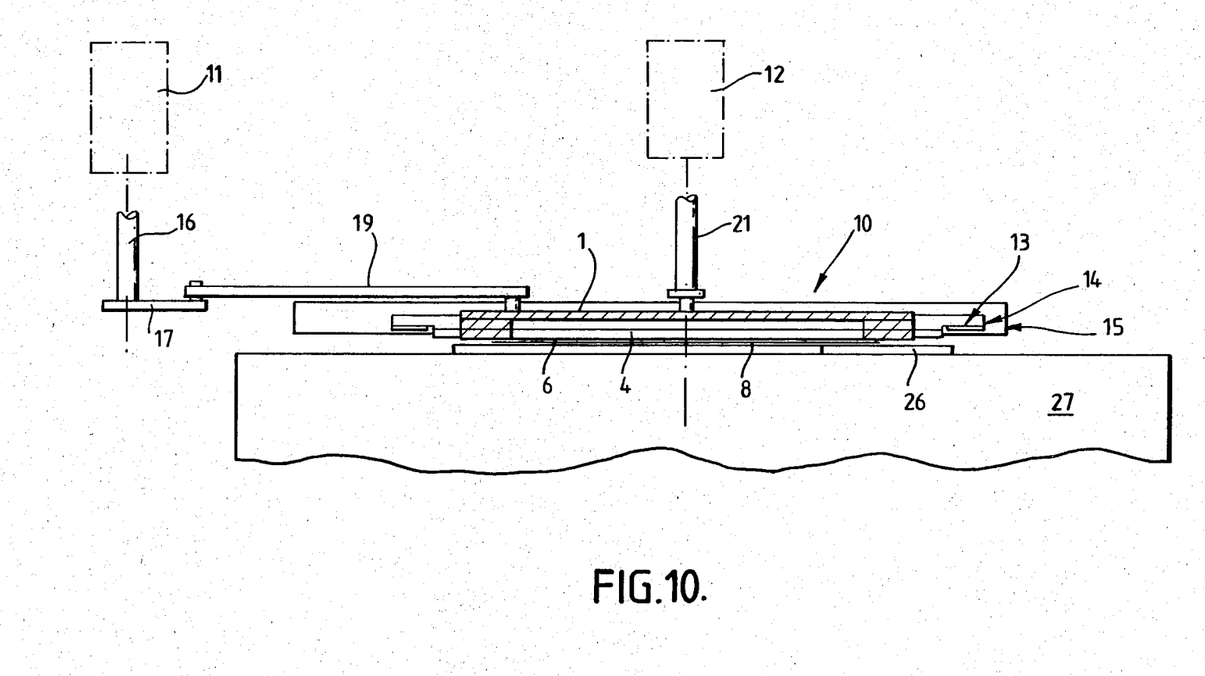

The components illustrated in either FIG. 4, or FIGS. 5–8, (which may define, or partly define, or be contained by, an ionization chamber, mentioned above) are contained by scanning head 10, as shown in FIGS. 9 and 10, and scanning head 10 is mounted for slidable movement in X and Y orthogonal planes (as will be described below). The scanning head which contains or defines the ionization chamber locates the gold strips 2 and wires 4 in order to collect from individual ionization events within the chamber. The co-ordinates of such events are determined (as explained below) with regard to the co-ordinates of the crossing point (or points) which are nearest to the event (or events) and with regard to the position of mask 6 relative to the radiogram 8. The ionization chamber is either flooded with a continuous stream of gas or mixture of gases (typically 90% argon, 10% methane), or is sealed and contains a gas or gas mixture (e.g. when the mask is in accordance with FIGS. 7 and 8, or when through apertures in the mask are covered by mica windows, as mentioned above). The gas connections to the ionization chamber have not been shown in FIGS. 9 and 10 in order to simplify the drawings. In the case of using a continuous gas stream to flood the chamber, the leakage between the peripheral regions of the mask 6, i.e. covering the lower surface of the frame 5 (FIG. 4) and the upper surface of a plate (e.g. made of glass) which supports the radiogram 8 is minimal and a constant gas throughput can be maintained to avoid air entering the ionization chamber, since it is important, in use, to maintain gas purity within the ionization chamber.

Figure 3:
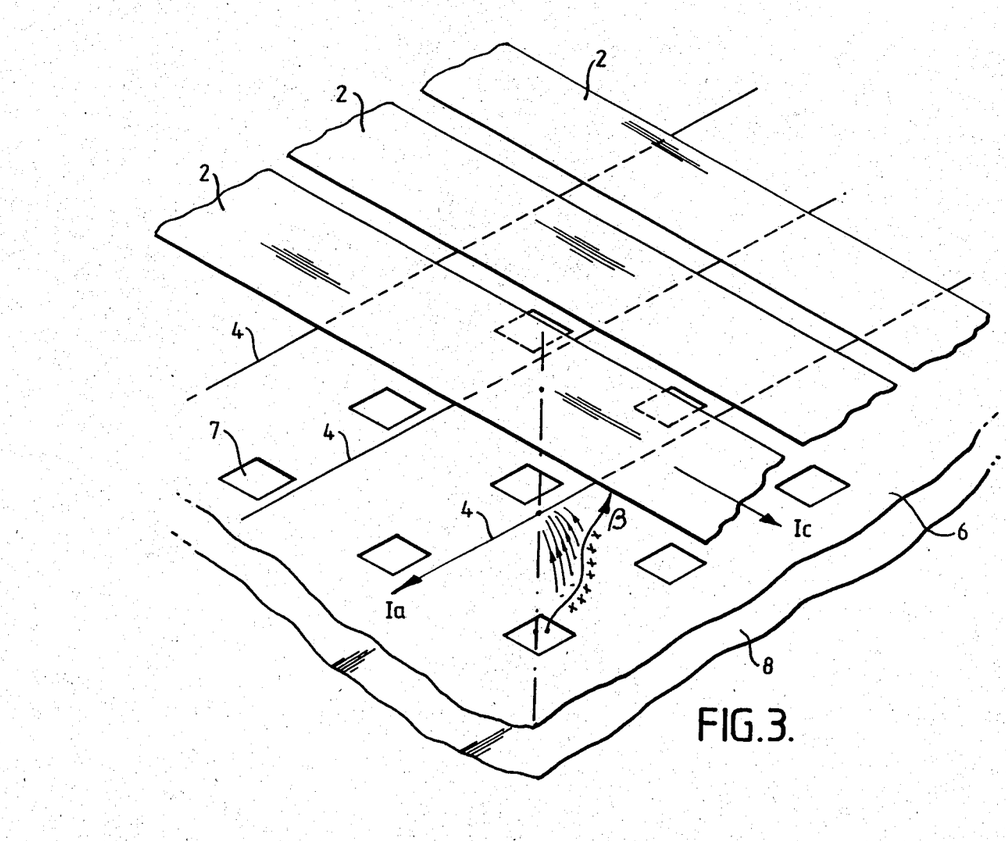
FIG. 3 schematically illustrates, in perspective, detecting electrode assemblies.

Referring to FIG. 3, a section of the ionization chamber is shown wherein the radiogram 8 is positioned beneath mask 6 which has a regular array of square mask zones or apertures 7. Only beta particles from radioactive areas immediately beneath mask zones or apertures 7 can enter the gas space in the ionization chamber, i.e. between mask 6 and the detecting electrode assemblies. The mask 6 is maintained at earth potential and the thin wires 4 (0.1 mm in diameter) are maintained at a high positive potential to provide an accelerating field.

The detecting head, comprising the detecting electrode assemblies, may be used with conventional pulse counting means, such as the type which includes delay lines, in order to provide an output related to the distribution of radioactivity. Alternatively, the detecting head may be used with the pulse and data processing circuit shown in FIG. 12.

Figure 12:
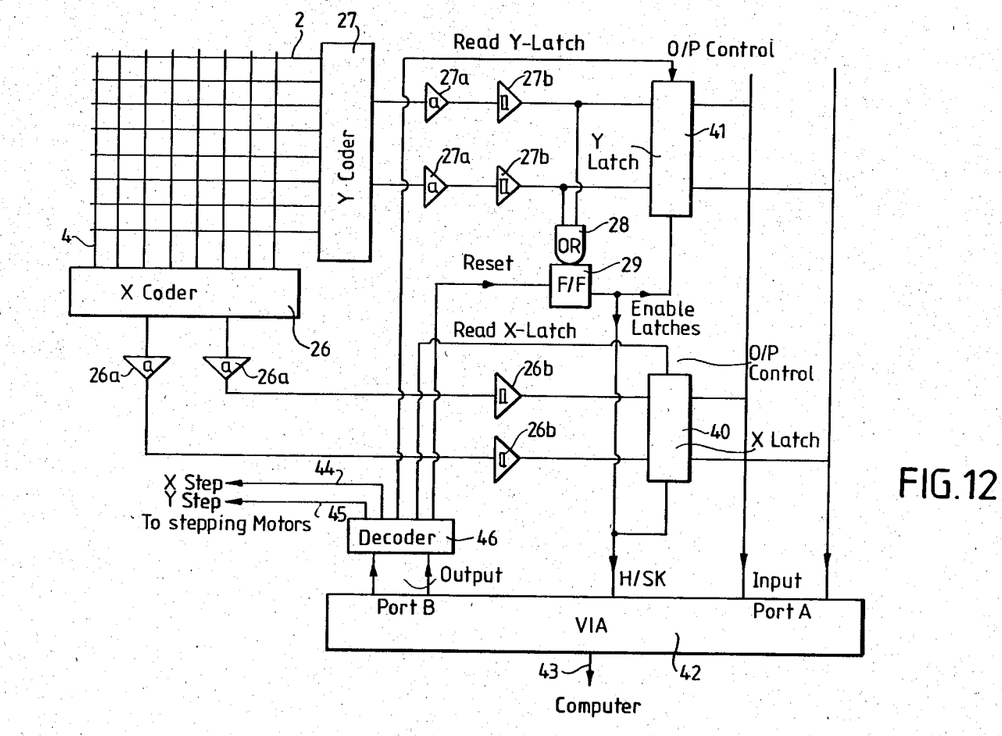
FIG. 12 illustrates a circuit for acquiring data from the pulse transformers and for controlling stepping motors used to drive the detecting head.

As shown in FIG. 12, the wires 4 are connected to a coding device 26 to provide coded signals in the X co-ordinate and the gold strips 2 are connected to a coding device 27 for providing coding signals in the Y co-ordinate. The purpose of these coding devices will be described below.

As shown in FIG. 3, ionization of the gas in the ionization chamber is caused by a beta particle passing through any one of the mask zones or apertures 7. The negative ions and electrons so produced are accelerated towards the anode wires 4 and this causes an avalanche which produces more ions, both negative and positive. These ions are respectively collected by the anode wires 4 and cathode strips 2 to produce respective currents Ia and Ic as shown. The cathode strips 2 collect positive ions in view of the fact that they are maintained at a negative potential with respect to the highly positive anode wires. The current flowing to the conductive part of the mask 6 is not used, but is minimized by the design of the ionization chamber.

The signal currents Ia and Ic are supplied to the respective coding devices 26,27 (FIG. 12) in order to provide position co-ordinates of the ionizing event with respect to the scanning position of mask 6 relative to radiogram 8. In the latter regard, it will be noted, in FIG. 3, that the strips 2 cross the wires 4 at points immediately above the centre of respective mask zones or apertures 7. Thus, signal currents Ia and Ic in particular wires 4 and strips 2 represent an ionizing event at a particular crossing point above the respective mask zone or aperture 7. Hence, any radioactivity is detected in the area of the radiogram 8 which is exposed by the mask zone or aperture 7 to the crossing point (for a given scanning position of mask 6). Thus, the position co-ordinates of individual ionizing events can be detected across the array of mask zones or apertures 7 and the corresponding cross points of wires 4 and strips 2 (for each scanning position of mask 6).

Since the crossing points of the wires 4 and strips 2 are permanently located above the centres of the respective mask zones or apertures 7, there is no change in the sensitivity of detection as the scanning head 10 moves relative to the radiogram 8 along its predetermined scanning path. In this case, the scanning path is serpentine in shape (to provide a raster) whereby sequential and adjacent scanning areas seen by the mask zones or apertures 7, for each scanning step, for respective rasters or scanning regions on the radiogram 8 are exposed to the respective crossing points of the electrode assemblies. Such scanning is achieved by means of respective stepper motors 11,12 as shown in FIG. 9 which are coupled to the scanning head 10 to drive it in the X and Y co-ordinate directions.

As shown in FIGS. 9 and 10, the scanning head 10 is mounted on a slide 13 which, in turn, is mounted in a slide 14 allowing motion at right angles to that of slide 13. The motions of slides 13,14 are respectively represented by arrows a and b in FIG. 9. Slide 14 is mounted in a fixed support 15.

Stepper motors 11 and 12 have a respective output shaft 15,21 fast with an eccentric 17,22 which is pivotally connected at 18,23 to a connecting rod 19, 24. The other end of rod 19,24 is pivotally connected, at 20,25 to the scanning head 10. Thus, stepped motion of shafts 16,21 of motors 11,12 caused respective linear motions of the scanning head 10 in the X and Y co-ordinate directions.

As shown in FIG. 10 which illustrates a cross-section of the detecting head assembly illustrated in FIG. 9, a radiogram 6 (usually in the form of a piece of paper of thin polymer sheet) is mounted on plate 26 which rests on a base 27 of the apparatus. The stepper motors 11,12 are controlled (as explained below) in order to move the scanning head 10 in a series of sequential steps so that it follows the serpentine scanning path. Each of the crossing points of the wires 4 and strips 2 in the scanning head 10 are thereby sequentially exposed to a series of adjacent scanning areas forming the respective scanning regions on the radiogram 8.

The number of steps in each scanning sequence depends on the shape and dimensions of the mask zones or apertures 7 and the type of radiogram to be scanned. For example, the mask 6 may be replaced by one having either smaller or larger mask zones or apertures, to vary the resolution. Moreover, the scanning head 10 may alternatively be moved in a sequence of scanning steps in one direction only, in the case where the radiogram 8 contains columns of bands of radioactive material which are scanned simultaneously in the direction of the respective columns (see FIG. 1a).

Figure 11:
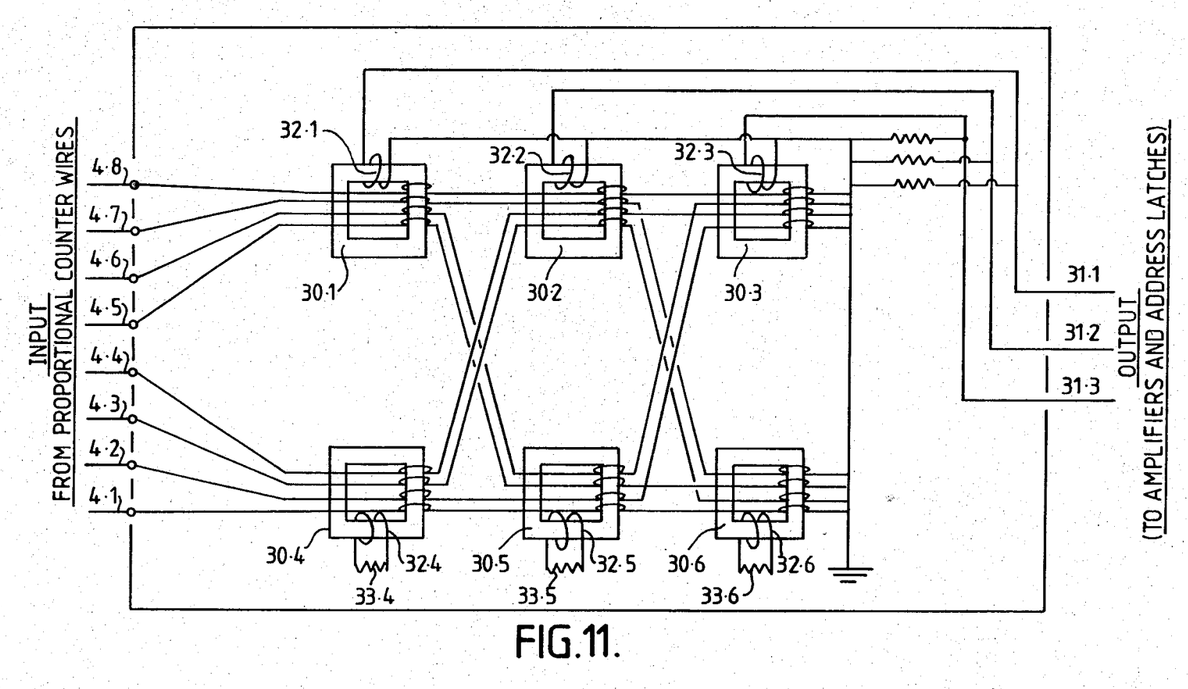
FIG. 11 illustrates pulse transformers which are used to provide a coded signal output from the column-by-row matrix of conductors in the detecting electrode assemblies shown in FIG. 3.

Turning now to FIG. 11, the construction and operation of the coding devices 26,27 will now be explained. As shown in FIG. 11, each coding device 26,27 comprises a plurality of balanced transformers 30.1–30.6 which couple the signal outputs from the wires 4 or strips 2 to an output (31.1–31.3). In general, if the scanning head includes $2^n$ wires (i.e. wires 4 and strips 2), the coding devices will produce n outputs which are coded in a binary pattern. For example, assuming (as shown in FIG. 11) that the X coding device 26 is connected to eight wires 4, designated as 4.1–4.8 in FIG. 11, individual signal inputs on the wires 4 will produce the following binary outputs,

| Input Wire 1 | Output |
|---|---|
| 1 | 000 |
| 2 | 001 |
| 3 | 010 |
| 4 | 011 |
| 5 | 100 |
| 6 | 101 |
| 7 | 110 |
| 8 | 111 |

Thus, only 3 output wires 31.1,31.2 and 31.3 are necessary to provide the binary output (mentioned above) from each of the signal inputs 4.1–4.8.

Output windings 32.1–32.3 of transformers 30.1–30.3, which provide the binary output signals, are connected to the binary output terminals 31.1–31.3. However, the equivalent windings 32.4–32.6 of transformers 30.4–30.6 are connected to respective resistors 33.4–33.6 to provide a balancing function. Apart from signal input wire 4.1, each of the signal input wires is connected to one or more input windings on the cores of transformers 30.1–30.3, (i.e. to provide the respective binary outputs mentioned above). For example, considering an input signal on wire 4.3 (representing the digit 3), the wire 4.3 is not connected to transformers 30.1 and 30.3, but it is connected to transformer 30.2, thus providing the binary output 010. Where a signal input wire is not connected to any of the transformers 30.1–30.3, it is connected, instead to the corresponding 'dummy' transformer 30.4–30.6. Thus, in the case of wire 4.3, the wire is connected to windings on the wires of transformers 30.4 and 30.6 (but not to transformer 30.5). Hence, the balancing function is provided for input wire 4.3 and, similarly, for each of the other input wires.

Each pulse transformer 30 is preferably constructed with a ferrite core having a C-shaped portion and a pillar-shaped portion (to close the C-shape thereby forming the ring shaping core). This facilitates manufacture, since the coding wires are wound on the respective pillars which are then attached to the C-shaped portions.

Referring now to FIG. 12, which illustrates a suitable data acquisition and scanning control circuit, the matrix of wires 4 and strips 2 is connected to the coding devices 26,27 as shown. The signals from each coding device 26,27 is amplified by amplifiers 36a,27a (only two of which are shown for ease of illustration) and are shaped using Schmitt Triggers 26b,27b as shown. An OR circuit 28 produces an output if there is a signal on any of the outputs from the Schmitt triggers 27b and this output sets a flip-flop or latch 29. The output of latch 29 enables X and Y latches 40,41, thus recording the binary coded postion of an ionizing event, or beta particle, detected by the scanning head 10. The X and Y latches 40,41 are tri-state devices connected to the input port A of a VIA 42 which is connected to a computer input bus 43. When the latches 40,41 are enabled, a handshake, H/SK, input of the VIA 42 is charged, and thus is sensed by the computer (not shonw). When the computer senses that the handshake signal H/SK has changed, an output control signal to the X tri-state latch 40 is created by putting the appropriate data signals on the output port B of the VIA 42. The output control signals 44,45 are created by decoding (46) the signals on port B. The appearance of a signal on the output control of the X data latch 40 causes the X co-ordinate of the ionizing event or beta particle to be entered into the computer through port A. The signals on port B are then changed to cause the contents of the Y latch 41 to be put onto port A and read by the computer. The X step and Y step signals may then be created by putting new signals on port B to cause the scanning head as a whole, to scan over the distribution of activity on the radiogram 8. The signals on port B are produced by a program running in the computer, and the signals on port A are read by the same program. After both the X and Y latches 40,41 have been read and approprite pulses sent to the stepping motors 11 and 12, the system is reset again by decoding signals placed on port B.

The computer program builds up two dimensional histograms which describe the distribution of activity which is being measured, i.e. the numbers of events detected at each addressed position are accumulated and stored. The location at which an event is stored will depend both on the co-ordinates of the event in the scanning head 10 and the current scanning position of the mask zones or apertures 7 in the scanning path.

When the data has been stored in the computer, it can be displayed for viewing on the computer monitor, or printed out on a photographic plate using a computer-controlled scanning light source. The computer can also be programmed to recognise particular band patterns, or to identify particular features of, or changes in band or spot patterns.

A suitable coder (26,27) for use in FIG. 12 is 74LS138.

A suitable latch (40,41) for use in FIG. 12 is 74LS373.

A suitable VIA (42) for use in FIG. 12 is 6522.

A suitable Schmitt trigger (26,27) for use in FIG. 8 is SN74LS14.

The above described technique has some significant advantages in requiring only a few components whilst providing a very rapid parallel output which will allow high counting rates. Current multiwire proportional counters mainly use delay line systems for sensing the positions of events. This limits the overall count rates to about 1000 per second. The technique described with reference to FIG. 12 should work up to at least 100,000 counts per second and probably more depending upon the associated electronics.

I claim:

1. Apparatus for providing output signals relating to individual ionizing events due to radioactive decay of material in a sample medium on a planar support, said apparatus comprising:

A an ionization chamber;

B a scanning head disposed in said ionization chamber and including two detecting electrode assemblies which are located in spaced apart relationship, each detecting electrode assembly having an array of spaced conductors, the conductors on one array extending transversely of the conductors of the other array thereby providing a plurality of conductor crossing points; and a mask having a plurality of radiation transmissive zones therein, said mask being supported relative to said detecting electrode assemblies such that said radiation transmissive zones respectively correspond with said conductor crossing points;

C means supporting said scanning head in juxtaposition with a sample receiving zone for receiving said sample medium so that when the sample medium is in place, the mask is then in close proximity to its planar support; and D scanning means to cause relative movement between said scanning head and said sample receiving zone so that said radiation transmissive zones in said mask scan a predetermined path relative to said sample receiving zone, whereby said radiation transmissive zones expose said corresponding crossing points to respective scanning regions of said sample receiving zone and said electrode assemblies yield said output signals.

2. Apparatus according to claim 1, wherein said mask comprises a planar member supported by a frame.

3. Apparatus according to claim 1, wherein said mask comprises an apertured conductive foil sandwiched between an insulating sheet and an apertured plate.

4. Apparatus according to claim 1, wherein said mask is spaced from said detecting electrode assemblies by an insulating frame, and wherein an insulating member extends beneath respective end portions of the conductors of the detecting electrode assembly adjacent said frame.

5. Apparatus according to claim 1, wherein said detecting electrode assemblies form a unit sub-assembly and said mask forms another unit sub-assembly, said unit sub-assemblies being held together by temporary fixing means to allow any one of a plurality of masks, each having radiation transmissive zones of different dimensions, to be used as required.

6. Apparatus according to claim 1, wherein said mask has at least one row of radiation transmissive zones for scanning a sample medium having bands of radioactivity arranged in columns, said scanning means causing said relative movement so that each radiation transmissive zone in said row scans respective bands of radioactivity in said columns.

7. Apparatus according to claim 1, wherein said mask contains a regular array of said radiation transmissive zones arranged in columns and rows, and the scanning means is constituted by two stepping motors for causing such relative and respective movements as to provide a serpentine scanning path.

8. Apparatus in accordance with claim 1 further including signal processing means connected to the conductors of said detecting electrode assemblies; said signal processing means including means for coding the output signals from said detecting electrode assemblies with regard to position coordinates of individual ionizing events detected in said scanning regions, and a processor for processing the coded signals in order to provide an output related to the distribution of radioactivity in said sample medium.

9. Apparatus according to claim 8, wherein said processor includes data acquisition and scanning control means, the latter means comprising latch means for recording the position of an ionizing event, VIA means coupled to an output port to provide control signals for said scanning means, read signals for said latch means and an output to logic means for enabling said latch means, said latch means having output connected to an input port, and said VIA means providing an output for a computer.

10. Apparatus according to claim 9, wherein said computer is programmed to build up a two-dimensional histogram of the distribution of radioactivity in said medium.

* * * * *